United States Patent [19]

Champaigne et al.

[11] Patent Number: 5,362,027
[45] Date of Patent: Nov. 8, 1994

[54] FLOW REGULATING VALVE FOR MAGNETIC PARTICLES

[75] Inventors: Jack M. Champaigne; John J. Wieczorek, both of South Bend, Ind.

[73] Assignee: Electronics, Incorporated, Mishawaka, Ind.

[21] Appl. No.: 152,466

[22] Filed: Nov. 12, 1993

[51] Int. Cl.⁵ .................................. F16K 31/02
[52] U.S. Cl. .................. 251/129.01; 137/251.1; 137/831; 137/909
[58] Field of Search .............. 137/251.1, 831, 909; 251/129.01

[56] References Cited

U.S. PATENT DOCUMENTS

| | | | |
|---|---|---|---|
| 2,651,258 | 9/1953 | Pierce | 137/909 X |
| 3,406,704 | 10/1968 | Van Fossen | 137/251.1 |
| 3,626,964 | 12/1971 | Van Fossen | 137/831 X |

*Primary Examiner*—Arnold Rosenthal
*Attorney, Agent, or Firm*—James D. Hall

[57] ABSTRACT

A valve for regulating the flow of materials which are made up substantially of magnetic particles. The valve includes an outer housing and a core assembly secured within the housing to define an annular flow passage therebetween. The core assembly supports an improved magnet/coil assembly. The magnet/coil assembly includes a permanent magnet positioned between a pair of pole pieces and has an electromagnetic coil surrounding the permanent magnet. When energized, the coil establishes a counteracting magnetic field to cancel the magnetic field of the permanent magnet, which allows an open flow condition in the valve. An annular cavity is defined between the permanent magnet and the coil, which provides for a flux leakage path for the permanent magnet. During an open condition, the flux from the permanent magnet is shunted across the cavity to reduce the flux to be counteracted by the coil's magnetic field and therefore reduce the power consumed by the valve.

5 Claims, 4 Drawing Sheets

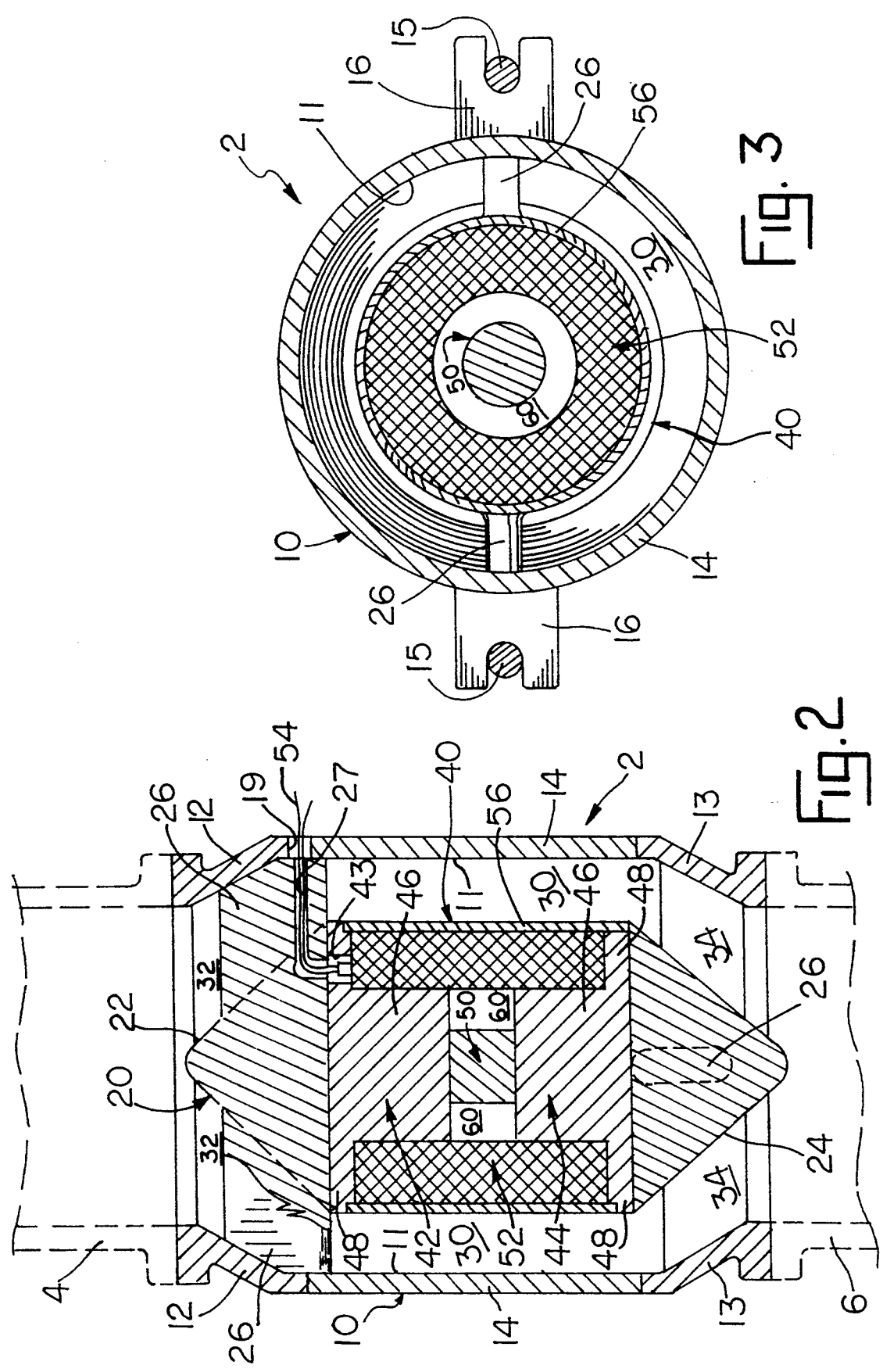

5,362,027

FLOW REGULATING VALVE FOR MAGNETIC PARTICLES

This invention relates to a valve for regulating the flow of magnetic particles and in particular to a valve with an improved magnet/coil assembly which reduces the power consumption of the valve.

BACKGROUND OF INVENTION

U.S. Pat. Nos. 3,406,704 and 3,626,964 both disclose a magnetic valve for regulating the flow of magnetic particles. As generally shown, these valves include an outer housing and a core assembly disposed within the outer housing to define an annular flow passage. The core assembly houses a magnet/coil assembly. The magnet/coil assembly includes a permanent magnet positioned between two pole pieces and an electromagnetic coil wound about the permanent magnet. The permanent magnet provides a constant magnetic field which is transmitted through the pole pieces to block the flow of magnetic particles through the flow passage. When a current is induced in the electromagnetic coils, a counter-acting magnetic field is created to cancel the influence of the permanent magnet. This allows free particle movement through the flow passage. Varying the current induced in the coil controls the generated field and the corresponding rate of particle flow through the passage. Consequently, the valve can regulate the flow rate between an open free flow condition whereby the magnetic field of the coil completely cancels the magnetic field of the permanent magnet and a closed fully retarded flow condition with no counter-acting magnetic field influencing the strong magnetic flux of the permanent magnet.

SUMMARY OF INVENTION

The valve of this invention has an improved magnet/coil assembly which reduces the power consumption needed to arrest the influence of the permanent magnets. The magnet/coil assembly defines an annular flux leakage cavity between the permanent magnet and the electrical coil. During an open or free flow condition, the leakage cavity provides a low reluctance path, which acts as a shunt for the magnetic flux from the permanent magnet. Shunting the flux of the permanent magnet into the leakage cavity reduces the flux passing through the pole pieces into the flow passage. Consequently, the power consumed in generating a counter-acting magnetic field in the coil to overcome the flux in the flow passage is reduced. While the leakage cavity reduces the flux from the permanent magnet present in the flow passage during an open condition, the leakage cavity does not substantially affect the operation of the valve or diminish the holding power of the permanent magnet during a closed condition. During a closed or no flow condition, the coil is not energized and the magnetic particles in the flow passage provide a low reluctance path relative to the reluctance of the leakage cavity. Consequently, the strong magnetic flux of the permanent magnet passes across the area of lower reluctance, which is the flow passage. Very little flux is lost to the leakage cavity during a closed condition; therefore, the leakage cavity does not degrade the holding power of the permanent magnets or the operation of the valve.

Accordingly, an object of this invention is to provide for a novel and unique valve for regulating the flow of magnetic particulate materials.

Another object is to provide a magnetic valve of low energy consumption without materially compromising the operation of the valve.

Another object is to provide for a magnetic regulator valve including a magnet/coil assembly, which has a cavity defined between the permanent magnet and the electrical coil for providing a flux leakage path.

Other objects will become apparent upon a reading of the following description.

BRIEF DESCRIPTION OF THE DRAWINGS

A preferred embodiment of the invention has been depicted for illustrative purposes only wherein:

FIG. 2 is a sectional view taken along line 2—2 of FIG. 1;

FIG. 3 is a cross-sectional view taken along line 3—3 of FIG. 1;

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

The figures show the valve 2 of this invention used to regulate the flow of materials which are made up substantially of magnetic particles. The flow of the particulate materials is denoted in the figures as arrows 8 and may include a mixture of magnetic and non-magnetic particles.

Figure 1:
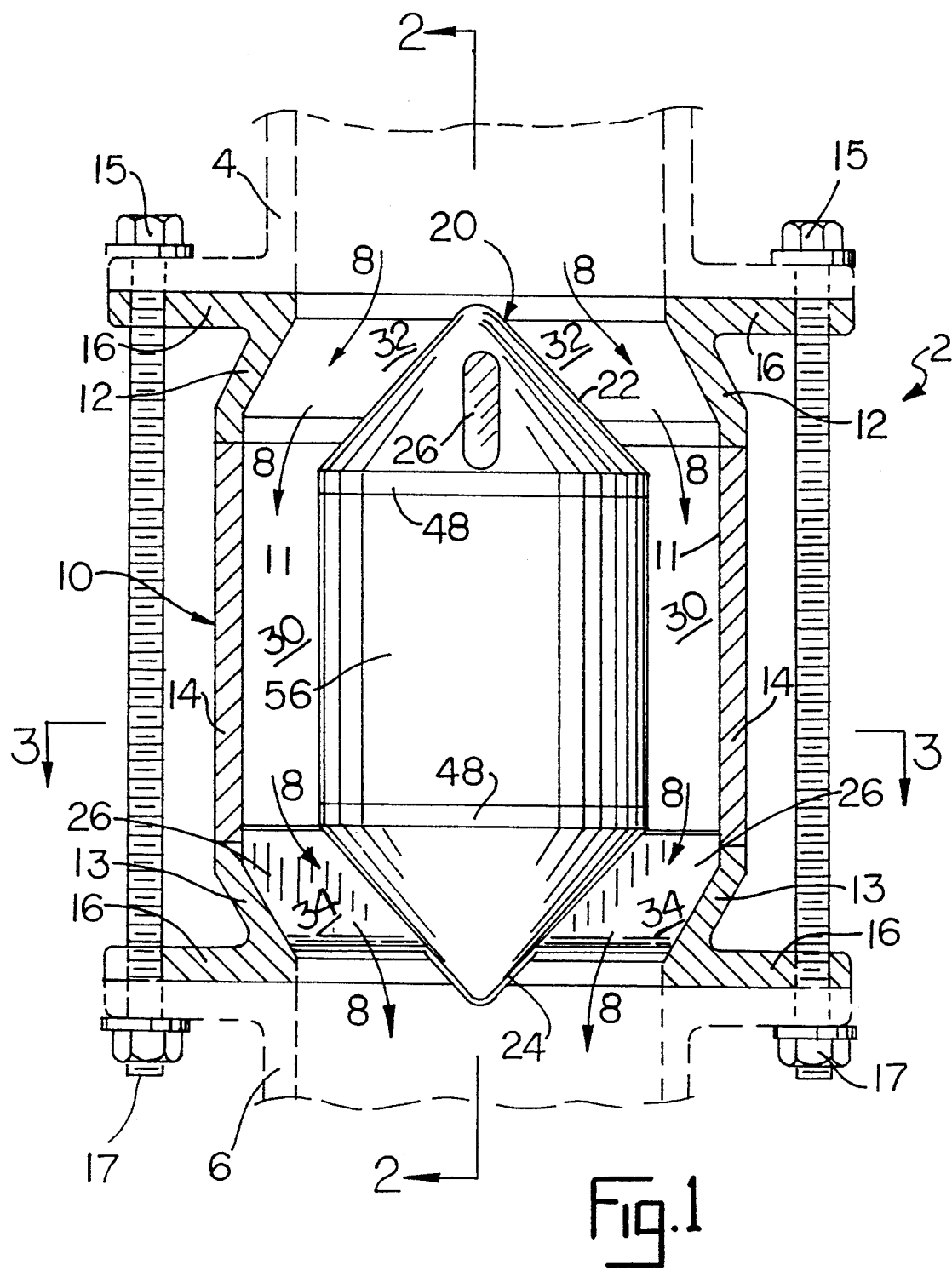
FIG. 1 is an elevational view, partly in section, of the valve construction of this invention.

As shown in FIGS. 1 and 2, valve 2 includes an outer tubular housing 10 and a centrally located core assembly 20 spaced from the inner housing wall 11 to define an annular flow passage 30 through the outer housing. Valve 2 has an inlet end 32 and an outlet end 34. Outer housing 10 includes an upper section 12, a lower section 13 and an tubular intermediate section 14. Upper and lower sections 12, 13 are constructed of a non-magnetic material. Tubular section 14 is constructed of a magnetic material. Tubular section 14 is clamped between upper and lower sections 12, 13 by bolts 15 and nuts 17. Bolts 15 extend through aligned openings in flanges 16. Mounting flanges 16 are also adapted for securing valve 2 to adjacent flow conduits 4, 6.

Core assembly 20 includes a pair of opposed conically shaped cap members 22, 24 which are suspended from the inner housing wall by wings 26. Cap members 22, 24 and wings 26 are constructed of non-magnetic material. Upper cap member 22 is suspended from inner housing wall 11 of upper housing section 12 at valve inlet end 32. Lower cap member 24 is similarly suspended from inner housing wall 11 of lower housing section 13 at valve outlet end 34. As taught in U.S. Pat. No. 3,626,964, core assembly 20 need not be concentrically oriented within housing 10. The conical shape of cap members 22, 24 streamlines the particle flow to reduce flow resistance and dissipate heat.

Core assembly 20 also includes a magnet/coil assembly 40 which is located between cap members 22, 24. Magnet/coil assembly 40 includes a pair of pole pieces 42, 44, a permanent magnet 50, an electromagnetic coil 52 and a cylindrical cover plate 56. Pole pieces 42, 44 each have a cylindrical body part 46 and an annular end flange 48. The base end of pole pieces 42, 44 is secured by conventional means to respective cap members 22, 24. Pole pieces 42, 44 are spaced by permanent magnet 50 and positioned in a head to head orientation. Electromagnetic coil 52 is preferably constructed of wound wire and surrounds permanent magnet 50 and body parts 46 of pole pieces 42, 44. Cover plate 56 encases the outside of coil 52 with the end flange 48 of each pole piece 42, 44 in direct communication with flow passage 30.

As shown in FIGS. 2 and 3, the diameter of permanent magnet 50 is less than the diameter of each pole piece body 46. Permanent magnet 50 is centered between pole pieces 42, 44 and spaced from the inner edges of coil 52 to define an annular flux leakage cavity 60. FIG. 2 shows permanent magnet 50 as a substantially cylindrical body; however, permanent magnet 50 can be of any similar configuration.

As shown in FIG. 2, a passage 27 is defined in one of wings 26 and an opening 19 is located at the junction of upper housing sections 12, and tubular section 14 for communication with passage 27. Passage 27 also communicates with a bore 43 in pole piece 42 to connect electrical leads 54 with coil 52. Both the positive and negative leads may pass through the described passages.

Figure 4:
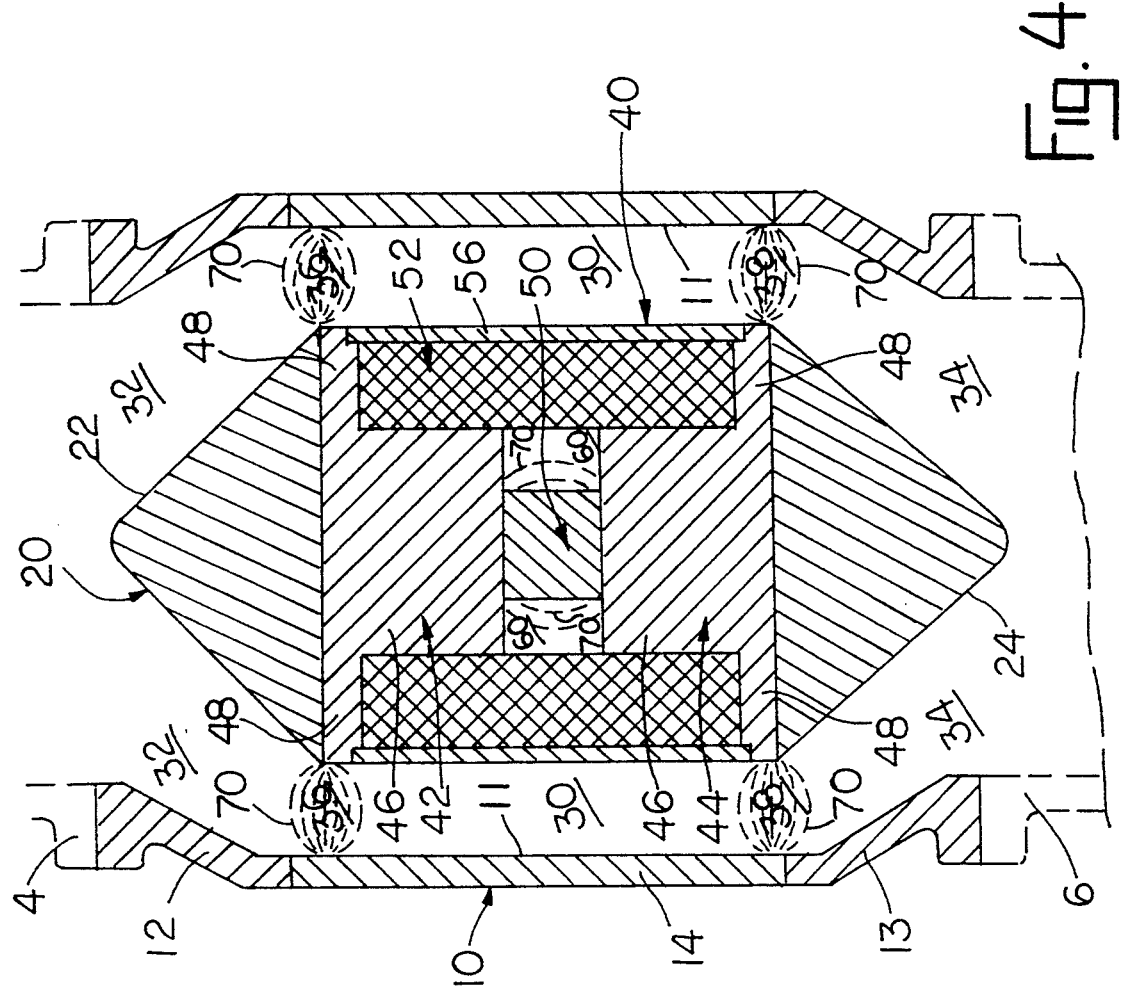
FIG. 4 is a sectional view of the valve of this invention illustrating the valve in a closed orientation.

In a closed or retarded flow condition (FIG. 4), no current is induced in coil 52. As shown in FIG. 4, the magnetic flux 70 from permanent magnet 50 passes through the flux working gaps 36, 38 of flow passage 30 between the exposed flange ends 48 of pole pieces 42, 44 and tubular housing section 14. Flux 70 from permanent magnet 50 flows upwardly through pole piece 42 and across working gap 36 to housing section 14. Flux 70 travels through housing section 14, across working gap 38, through pole piece 44 and returns to permanent magnet 50. The magnetic particles in particle flow path 8 are attracted by flux 70 and accumulate in the working gaps 36, 38 to arrest the particle flow through valve 2. During this no flow condition, the magnetic particles in flow passage 30 provide a lower reluctance path for the magnetic flux 70 from permanent magnet 50 than does leakage cavity 60. Consequently, relatively little flux 70 flows into the leakage cavity 60 and particle flow 8 can be substantially halted. Since a negligible amount of flux 70 is lost to leakage cavity 60 during the no-flow condition, the operation and holding power of valve 2 is not materially affected by the presence of leakage cavity 60.

Energizing coil 52 creates an open or particle flow condition through valve 2. When an input or cancelling current is induced in coil 52 a counter-acting magnetic field (not shown) is created that isolates the magnetic flux 70 of permanent magnet 50 from flow passage 30. The counter-acting magnetic field from coil 52 cancels the magnetic influence of permanent magnet 50, which allows particle movement through flow passage 30. Varying the cancelling current to coil 52 controls the influence of the counter-acting magnetic field to regulate particle flow 8 through flow passage 30.

Figure 5:
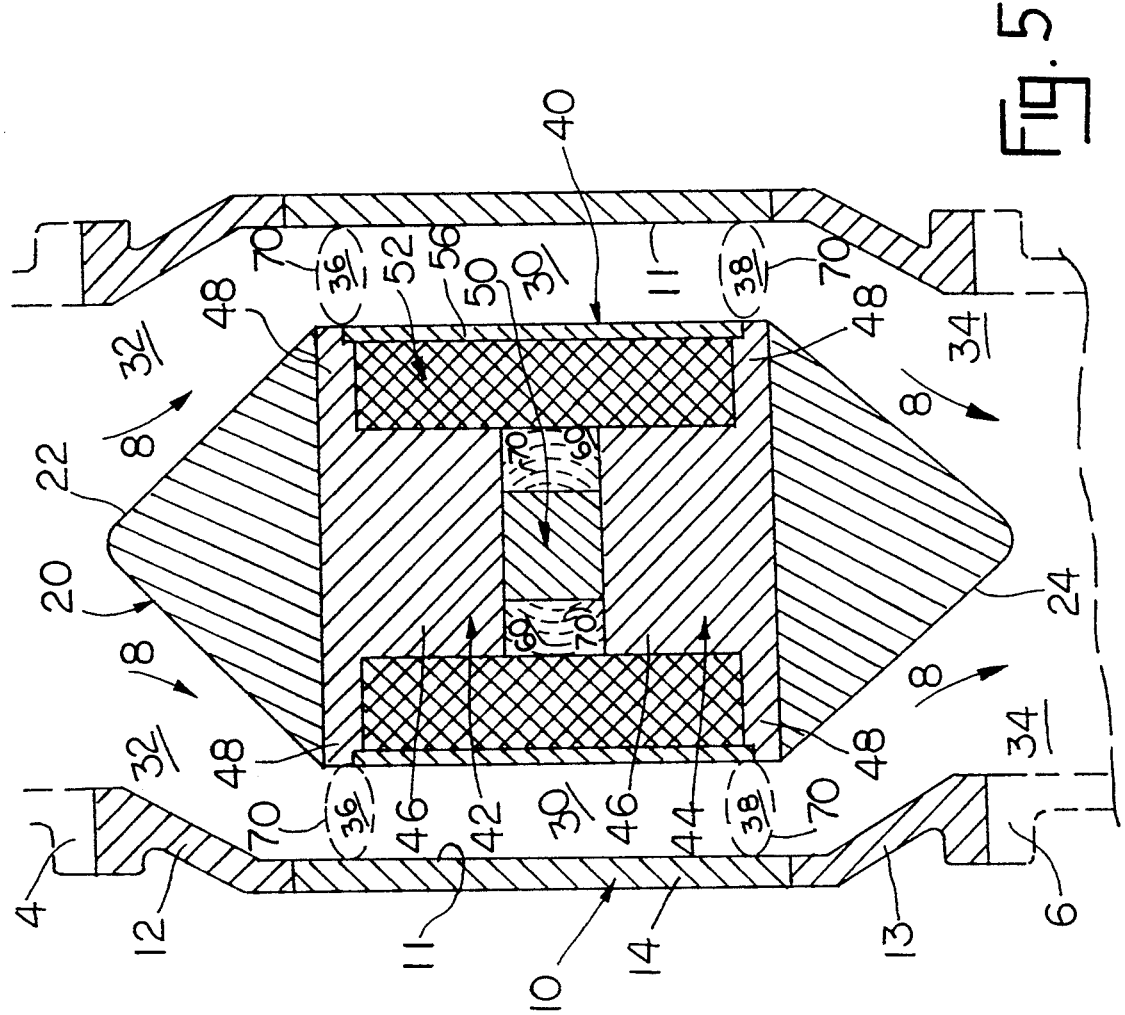
FIG. 5 is a sectional view similar to FIG. 4, but showing the valve in an open orientation.

As illustrated in FIG. 5, when the canceling current is applied to coil 52, the working gaps 36, 38 will have a higher reluctance path than leakage cavity 60. The counter-acting magnetic field established by coil 52 opposes flux 70 from permanent magnet 50 and reduces flux 70 in working gaps 36, 38. As flux 60 in working gaps 36, 38 decreases, flux 70 increases in the lower reluctance path of leakage cavity 60. As shown in FIG. 5, leakage cavity 60 acts as a shunt with a substantial portion of flux 70 moving across leakage cavity 60. Consequently, the amount of canceling current needed to establish a counteracting field in coil 52 to overcome the diminished influence of flux 60 in Flow passage 30 is substantially reduced. The presence of leakage cavity 60 allows the influence of permanent magnet 50 to be reduced in the critical flow passage 30 during an open condition without affecting the influence of permanent magnet 50 during closed conditions.

It is understood that the above description does not limit the invention to the details given, but may be modified within the scope of the following claims.

I claim:

1. A valve for regulating the flow of particulate materials, portion of which materials are magnetic, said valve comprising:
   a valve housing having an inner wall,
   an assembly supported within said valve housing and spaced from said valve housing inner wall to define a flow passage therebetween, said assembly including a permanent magnet, and an electromagnetic coil positioned between said magnet and said flow passage, said coil being spaced from said magnet to define a cavity therebetween, said permanent magnet constituting means for attracting said particulate materials to impede the movement of said particulate materials through said flow passage,
   means for energizing said coil whereby said energized coil constitutes means for counteracting influence of said permanent magnet to thereby permit movement of said particulate materials through said flow passage,
   said cavity constituting means for reducing said permanent magnet influence when said coil is energized.

2. The valve of claim 1 wherein said assembly also includes opposite pole pieces, said permanent magnet positioned between said pole pieces, a portion of each pole piece located adjacent said flow passage, said pole piece constituting means for transmitting influence of said permanent magnet to said flow passage.

3. The valve of claim 2 wherein each pole piece includes a cylindrical body part and an annular end flange, each end flange is in direct communication with said flow passage, said permanent magnet positioned between each pole piece body part with the body parts positioned in a head-to-head orientation and each end flange spaced from said magnet.

4. The valve of claim 3 wherein each pole piece body part includes an outer wall, said coil overlying said outer walls of each said pole piece.

5. The valve of claim 4 wherein said permanent magnet is inset from said pole piece outer walls to further define said cavity.

* * * * *